Patented Oct. 16, 1951

2,571,104

UNITED STATES PATENT OFFICE 2,571,104

POLYMYXIN PRODUCTION

Robert G. Benedict, Peoria, Ill., assignor to the United States of America as represented by the Secretary of Agriculture No Drawing. Application May 7, 1948,
Serial No. 25,775

6 Claims. (Cl. 195—96)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the production of polymyxin, produced by an organism, *Bacillus polymyxa*.

In application Serial No. 764,550, filed July 29, 1947, now abandoned, by Benedict and Stodola, a method for producing polymyxin is described. This method comprises cultivating *B. polymyxa* in an aqueous medium comprising a proteinaceous material and an assimilable carbon source. The polymyxin is elaborated in a highly active form and may be isolated from the culture medium. The antibiotic thus produced is effective in preventing the growth of several pathogenic gram negative organisms.

This invention relates to the discovery of an organism capable of elaborating much greater amounts of polymyxin, and to a method of cultivating the organism. More specifically, this invention relates to the discovery of a stable ultraviolet mutant, which gives yields of polymyxin greatly exceeding those heretofore obtained by any other organism.

A strain of *B. polymyxa* was subjected to ultraviolet irradiation, during the course of extended investigation. According to a standard procedure, the culture was spread upon an agar surface so as to obtain isolated survivors. The surviving cells were allowed to develop. A culture from a colony of one of the survivors has been found to produce polymyxin in amounts approximately five times as large as that produced by the parent strain.

This mutant will hereafter be identified as NRRL B–719 (u. v.–37). It is stable, retaining its capacity for producing polymyxin at this time beyond the fortieth generation. It is capable of producing greatly increased yields under substantially all fermentation conditions applicable generally to *B. polymyxa* organisms.

I have also discovered that the yield of the polymyxin from this or other *B. polymyxa* organisms can be greatly increased by "feeding" during the fermentation period.

In the past, polymyxin has been produced by cultivating *B. polymyxa* according to the description contained in the aforementioned application. The organism is one which notoriously produces a slime or mucilaginous material in the course of the cultivation which usually takes up to five days or longer. The slime production is aggravated by the initial presence of assimilable carbon source, such as sugars or starch. If more than 2 percent assimilable carbon source is employed in the initial fermentation medium, the resulting culture liquor is difficult to handle and recovery of the desired antibiotic is undesirably tedious and involved. I have discovered that about double the ultimate yield of antibiotic may be obtained, and at the same time slime formation reduced considerably by "feeding" the assimilable carbon in the fermentation process. For example, I use media heretofore employed containing initially about 1 to 2 percent sugar and add about an equal amount of sugar during the fermentation, preferably during the forty-eighth to seventy-second hour. Accordingly, the final culture liquors contain very little slime or mucilaginous material, and the increased amount of the antibiotic is easily recoverable.

In general, the fermentations according to my invention are carried out under submerged aerobic conditions. The assimilable carbon source employed may be dextrose or glucose, xylose, hydrol, starch, and the like. The proteinaceous material may be corn steep liquor, peanut flour, soya flour, yeast extract, ground grain, or the like, in an amount ranging from one-half to five percent, preferably one-half to one and one-half percent of the medium. For my purposes, I prefer peanut flour or meal as the proteinaceous material, since it results in high yields of antibiotic and is economical.

The following examples exhibit the invention in greater detail. The parts are by weight unless otherwise specified.

EXAMPLE I

Aqeous media consisting of 0.5 percent soya meal from which the oil had been extracted and 1 percent glucose to which 1 percent calcium carbonate was added, were inoculated separately with *B. polymyxa* NRRL Nos. B–719, B–367, and B–698 (known strains of *B. polymyxa*) and agitated in a shaker flask for several days. Assays were made after 72, 96 and 120 hours fermentation. At the end of 72 hours fermentation, 1 percent glucose was added to the media.

For comparison, identical media were inoculated with NRRL B-719 (u. v.-37). Assays were made after 68, 92, and 116 hours fermentation. After 68 hours fermentation, 1 percent glucose was added to the flasks.

The results of this example are shown in Table 1. The tabular values are units of the antibiotic produced per ml. of culture liquor. The unit of antibiotic is an arbitrary value which will just inhibit the growth of *Escherichia coli* on an agar plate. It is approximately equivalent to 0.5 microgram of the purified substance.

Table 1

| Organism | Assay (units) | | |
|---|---|---|---|
| | 72 hours fermentation | 96 hours fermentation | 120 hours fermentation |
| NRRL B-719 | 120 | 204 | 135 |
| NRRL B-367 | 165 | 144 | 219 |
| NRRL B-598 | 69 | 123 | 225 |
| | 68 hours fermentation | 92 hours fermentation | 116 hours fermentation |
| NRRL B-719 (u. v.-37) | 329 | 424 | 1,000 |
| | trace | 960 | 900 |
| | 34 | 840 | 920 |
| | 24 | 920 | 768 |

EXAMPLE II

Aqueous media consisting of 0.5 percent soya flour from which the oil had been extracted and 1 percent glucose, to which 1 percent calcium carbonate had been added, were inoculated with three varied strains of *B. polymyxa* organisms of known type. For each organism tested, sets of fermentations were carried out employing the original medium, unsupplemented, as a control, and varying the time at which additional glucose was added in the remaining flasks of the set. The fermentations were carried out in shaker flasks. The results are shown in Table 2.

Table 2

| Organism | Assay (units) | | | |
|---|---|---|---|---|
| | 64 hours fermentation | 88 hours fermentation | 112 hours fermentation | 136 hours fermentation |
| *Organism A* | | | | |
| Control | 324 | 194 | 124 | |
| 1% glucose at 48th hr | 256 | 240 | 256 | 184 |
| 1% glucose at 72nd hr | 344 | 192 | 332 | 200 |
| *Organism B* | | | | |
| Control | 160 | 220 | 176 | |
| 1% glucose at 48th hr | 180 | 500 | 360 | 184 |
| 1% glucose at 72nd hr | 192 | 232 | 400 | 190 |
| *Organism C* | | | | |
| Control | 212 | 232 | 164 | |
| 1% glucose at 72nd hr | 204 | 232 | 352 | 212 |
| 1% glucose at 88th hr | 210 | 148 | 232 | 184 |

In Example II, the feeding can be carried out intermittently. The total amount fed as the supplementary assimilable carbon source should be from one-half to two percent assimilable carbon source. Other assimilable carbon sources can be employed, such as xylose, hydrol, starch and the like.

The following example illustrates the advantageous properties of peanut meal as the proteinaceous material in the production of the antibiotic.

EXAMPLE III

Aqueous media consisting of 1 percent peanut meal from which the oil had been extracted and 1 percent glucose to which 1 percent calcium carbonate had been added, were inoculated with three various known strains of *B. polymyxa* organisms. The peanut meal contained about 0.60 percent lipids. At the end of about 72 hours of fermentation, an additional 1 percent glucose was added. For comparison, similar fermentations were conducted substituting an equal amount of soya flour for the peanut meal. The results are shown in Table 3.

Table 3

| Organism | Assay (units) | | | |
|---|---|---|---|---|
| | 64 hours fermentation | 82 hours fermentation | 112 hours fermentation | 130 hours fermentation |
| *Organism D* | | | | |
| (peanut meal) | | | 222 | 324 | 480 |
| (soya flour) | | | 168 | 348 | 360 |
| *Organism E* | | | | |
| (peanut meal) | | | 186 | 384 | 480 |
| (soya flour) | | | 129 | 228 | 240 |
| *Organism F* | | | | |
| (peanut meal) | 201 | ¹ 600 | 222 | |
| (soya flour) | 143 | ¹ 348 | 176 | |

¹ Assay taken at 88 hours fermentation.

The peanut meal or flour used should have a low oil content. In general, within the preferred range of proteinaceous material of one-half to one and one-half percent, the yield of the antibiotic increases with an increase of peanut flour or meal.

Having thus described the invention, what is claimed is:

1. A process for producing polymyxin comprising cultivating *B. polymyxa* NRRL B-719 (u. v.-37) in an aqueous medium comprising a proteinaceous material which medium contains one to two percent assimilable carbon source at the start of the fermentation, and adding one-half to two percent supplementary assimilable carbon source during the course of the fermentation.

2. The process of claim 1 in which the supplementary assimilable carbon source is added during the 48th to 72nd hour of fermentation.

3. The process of claim 1 in which the proteinaceous material is peanut flour, the assimilable carbon source is glucose, and the supplement is added during the 48th to 72nd hour of fermentation.

4. A process for producing polymyxin which comprises cultivating *B. polymyxa* NRRL B-719 (u. v.-37) under submerged aerobic conditions in an aqueous medium containing one-half to one and one-half percent proteinaceous material, one to two percent assimilable carbon source and about one percent calcium carbonate, and adding one-half to two percent additional carbon source during the 48th to 72nd hour of fermentation, and recovering the produced polymyxin.

5. The process of claim 4 in which the proteinaceous material is peanut flour and the carbon source is dextrose.

6. The process for producing polymyxin which comprises cultivating *B. polymyxa* NRRL B-719 (u. v.-37) in an aqueous medium comprising a proteinaceous material and in the presence of an assimilable carbon source.

ROBERT G. BENEDICT.

REFERENCES CITED

The following references are of record in the file of this patent:

UNITED STATES PATENTS

| Number | Name | Date |
| --- | --- | --- |
| 2,344,025 | Christensen | Mar. 14, 1944 |
| 2,401,778 | Sjolander | June 11, 1946 |
| 2,445,748 | Demerec | July 27, 1948 |

OTHER REFERENCES

Stansley et al.: Bulletin Johns Hopkins Hospital, July 1947, pp. 43-54.

Brewer: Jour. Bact., October 1943, pages 395-396.